W. P. MILLER.
Traction-Wheel.
No. 23,853.
Patented May 3, 1859.
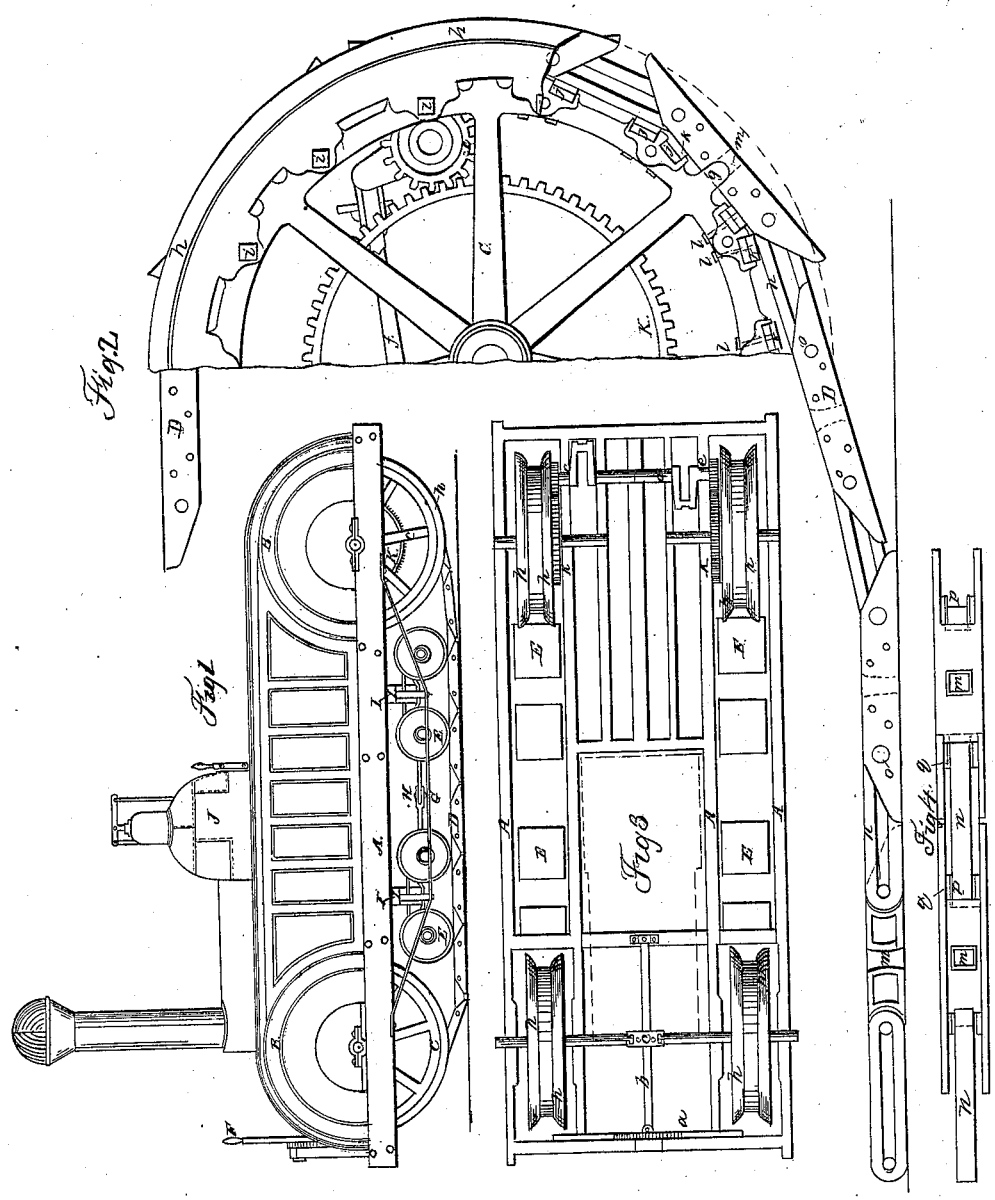

UNITED STATES PATENT OFFICE.

WARREN P. MILLER, OF MARYSVILLE, CALIFORNIA.

LOCOMOTIVE-MACHINE FOR PROPELLING PLOWS, &c.

Specification of Letters Patent No. 23,853, dated May 3, 1859.

*To all whom it may concern:*

Be it known that I, WARREN P. MILLER, of the city of Marysville, in the county of Yuba and State of California, have invented a new and useful locomotive-machine for drawing or propelling plows, harrows, sowers, or other machines or implements used in farming or otherwise, and to be used also on the public roads and elsewhere in propelling or drawing wagons, carriages, cars, or other vehicles or things for the transportation of freight, passengers, or other things where locomotive-power is required, which machine is known as the "Locomotive Traction Steam-Car;" and I hereby declare that the following is a full and exact description thereof, reference being had to the accompanying drawings and to the letters and figures of reference marked thereon.

The nature of my invention consists in providing the machine with portable tracks of a certain formation which going around and over the leading and driving wheels hereinafter mentioned are laid down on the ground as the machine moves forward so as to form safe, solid and firm tracks for the carrying wheels or trucks which support the car, so as to enable it to run over soft or sandy roads or places with the same facility as over solid roads without sinking in the earth, and at the same time furnishing a hard, smooth and comparatively straight surface for the carrying wheels to roll on, thereby saving a large amount of power.

To enable others skilled in mechanics to make use of my invention I will proceed to describe its construction and operation. I construct it as follows, to wit: The bed of the car rests on two pairs of broad double trucks or carrying wheels which support its entire weight—see Fig. 1, letter E. The bed of the car is made of timber framed and bolted together, in the usual manner, as shown in Figs. 1 and 3, letter A. I construct a pair of large wheels divided into straight sections as shown in Fig. 2, called leading wheels, and place them on the fore part of the car, suspended on axles, on each of which wheels are two broad flanges. The shaft of the leading wheels is more than equal in length to the breadth of the car, so as to permit the shaft and the wheels to traverse, and is in two parts connected in the center by a coupling in such a manner that each wheel may revolve independent of the other. In the next place the car is provided with two driving wheels as shown in Fig. 2, one on each side of the hind part of the car. They are made in the same manner as the leading wheels and the shaft of the driving wheels is made in the same manner as the shaft of the leading wheels. There is a cog wheel connected with each of the driving wheels as shown in Fig. 2. The car has two engines and the crank shaft of each engine has on it a spur wheel which works into the aforesaid cog wheel.

The track of the car is constructed as follows: It is composed of links, each link being in length equal to a section of the leading and driving wheels. The links are composed of iron and formed as follows: Each link is composed of two flat pieces of iron, as shown in Figs. 2 and 4, placed on each side of a block of cast iron and bolted fast, so as to make the whole link a little less in width than the space between the flanges of the leading and driving wheels, and the track is composed of as many of said links as will go around said leading and driving wheels between the flanges on each. There are two tracks, each track going around a leading and driving wheel on each side of the car, as shown in Figs. 1 and 2.

The car is put in motion by the power of steam acting on the spur wheels above named. The said spur wheels act on the aforesaid cog wheels which cog wheels by their action turn the driving wheels and by means of the track passing around both the leading and the driving wheels the leading wheels are turned and thus a forward motion is given to the car, all of which description of the construction and operation of said car is more fully set forth in the following table of reference and description to wit:

*Table of reference.*

Letter A, Figs. 1 and 3, bed of the car.
Letter B, Fig. 1, housing over track.
Letter C, Figs. 1 and 2, leading and driving wheels.
Letter D, Figs. 1, 2 and 4, the track.
Letter E, Figs. 1 and 2, trucks or carrying wheels.
Letter F, Fig. 1, steering wheel.
Letter G, Fig. 1, truss to support bed.
Letter H, Fig. 1, coupling of trucks.
Letter I, Fig. 1, bolsters of bed.
Letter J, Fig. 1, boiler.

Letter K, Figs. 1, 2 and 3, cog wheel.
Letter a, Fig. 3, rack and slide bar.
Letter b, Fig. 3, lever attached to slide bar.
Letter c, Fig. 3, coupling.
Letter d, Fig. 3, crank shafts of engines.
Letter e, Figs. 2 and 3, pinion wheel.
Letter f, Fig. 2, pitman of engine.
Letter g, Fig. 2, cog entering track.
Letter h, Figs. 2 and 3, broad flanges.
Letter i, Fig. 2, bolts.
Letter j, Fig. 2, block of elastic packing.
Letter k, Fig. 2, blocks of iron supporting track.
Letter l, Fig. 2, bolts holding packing.
Letter m, Figs. 2 and 4, mortise to receive cog.
Letter n, Figs. 2 and 4, center link.
Letter o, Figs. 2 and 4, pin forming joint in track.
Letter p, Fig. 4, iron washer.
Letter q, Fig. 4, elastic washer.

What I claim as my invention and desire to secure by Letters Patent is—

The combination of the endless chain or track with the leading and driving wheels c c, and supporting trucks e e, the whole constructed and operated substantially as and for the purposes set forth in said specification.

W. P. MILLER.

Attest:
GEORGE ROUEE,
CHARLES E. DE LONG.